United States Patent
Takasu et al.

(10) Patent No.: US 12,326,379 B2
(45) Date of Patent: Jun. 10, 2025

(54) EVENT DETECTION DEVICE AND EVENT DETECTION METHOD

(71) Applicant: ANRITSU CORPORATION, Kanagawa (JP)

(72) Inventors: Ryota Takasu, Kanagawa (JP); Taichi Murakami, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 145 days.

(21) Appl. No.: 18/323,516

(22) Filed: May 25, 2023

(65) Prior Publication Data

US 2023/0400381 A1 Dec. 14, 2023

(30) Foreign Application Priority Data

Jun. 14, 2022 (JP) .................. 2022-096096

(51) Int. Cl.
*G01M 11/00* (2006.01)
*H04B 10/071* (2013.01)

(52) U.S. Cl.
CPC ....... *G01M 11/3145* (2013.01); *H04B 10/071* (2013.01)

(58) Field of Classification Search
CPC .. G01M 11/30; G01M 11/31; G01M 11/3109; G01M 11/3118; G01M 11/3127; G01M 11/3136; G01M 11/3145; G01M 11/3154; G01M 11/3163; G01M 11/3181; G01M 11/319; H04B 10/071; G01D 5/35358; G01D 5/35361; G01D 5/35364
See application file for complete search history.

(56) References Cited

U.S. PATENT DOCUMENTS

| | | | | |
|---|---|---|---|---|
| 8,781,264 B2 * | 7/2014 | Maki | ........... | G02B 6/02 |
| | | | | 356/73.1 |
| 10,198,630 B2 * | 2/2019 | Noda | ........... | G01N 30/8634 |
| 11,632,172 B2 * | 4/2023 | Takasu | ........... | H04Q 11/0067 |
| | | | | 398/20 |
| 11,711,142 B2 * | 7/2023 | Desplat | ........... | G01M 11/3172 |
| | | | | 398/21 |

(Continued)

FOREIGN PATENT DOCUMENTS

| CN | 113489534 A | * | 10/2021 |
|---|---|---|---|
| CN | 114079503 A | * | 2/2022 |

(Continued)

*Primary Examiner* — Gordon J Stock, Jr.
(74) *Attorney, Agent, or Firm* — McDonald Hopkins LLC

(57) ABSTRACT

An object of the present disclosure is to improve an SN ratio while maintaining a distance resolution and to accurately detect an event occurrence location. An event detection device according to the present disclosure includes: an OTDR waveform acquisition unit that acquires an OTDR waveform of an optical fiber to be measured; a feature quantity extraction unit that performs wavelet transform on the OTDR waveform and generates a scalogram with each wavelet coefficient as a feature quantity; a peak extraction unit that calculates a noise threshold value from the OTDR waveform, and extracts a peak from the feature quantity on the scalogram based on the noise threshold value to generate a peak graph; and an event identification unit that identifies an event in the optical fiber to be measured from the peak graph.

4 Claims, 8 Drawing Sheets

(56) References Cited

U.S. PATENT DOCUMENTS

2010/0283785 A1* 11/2010 Satulovsky .............. G06T 7/13
                                                      382/207
2019/0290156 A1*  9/2019 Shimauchi ............ A61B 5/352
2022/0163686 A1*  5/2022 Zhao ...................... G06T 7/73
2023/0400334 A1* 12/2023 Takasu ............... G01D 5/35358
2023/0400383 A1* 12/2023 Takasu ............... G01M 11/3145

FOREIGN PATENT DOCUMENTS

| JP | H05-079134 | B2 | 11/1993 | | |
| WO | WO-2017094170 | A1 | * | 6/2017 | ......... G01N 30/8637 |
| WO | WO-2017168682 | A1 | * | 10/2017 | ............. G01N 30/86 |

\* cited by examiner

ID: 12,326,379 B2

EVENT DETECTION DEVICE AND EVENT DETECTION METHOD

TECHNICAL FIELD

The present disclosure relates to an event detection device and an event detection method that analyze an OTDR waveform using wavelet transform and detect an event in an optical fiber to be measured.

BACKGROUND ART

An optical time domain reflectometer (OTDR) device is known as a device that detects a position of a defect or a position of an open end in an optical fiber to be measured. The OTDR device measures an intensity of back scattered light of an optical pulse made incident from one end of the optical fiber to be measured, and estimates a position of a defect, a position of an open end, or the like by using a result of the measurement (see, for example, Patent Document 1).

Specifically, in a device according to the related art, an optical pulse is made incident into an optical fiber to be measured, and a back scattered light intensity at each position in the optical fiber to be measured is measured. For each position in the optical fiber to be measured, a difference in back scattered light intensity between two points separated by a predetermined distance between which the position is located is calculated. A position of a defect, a position of an open end, or the like is estimated from a position of a maximum value or a minimum value of the calculated difference amount.

RELATED ART DOCUMENT

Patent Document

[Patent Document 1] JP-B-H05-079134

DISCLOSURE OF THE INVENTION

Problem that the Invention is to Solve

In the related art, a narrower window width of a moving average of the back scattered light intensity improves a distance resolution but is susceptible to noise. Conversely, a wider window width reduces an influence of noise but deteriorates the distance resolution. Therefore, in the related art, there is a trade-off relationship between improving an SN ratio by suppressing the influence of noise and improving the distance resolution, and there is a problem that it is difficult to improve both. That is, in the related art, there is a problem that it is not possible to improve the SN ratio while maintaining the distance resolution, and to accurately detect an event occurrence location, such as a position of a defect, a position of an open end, or the like.

In order to solve the above problem, an object of the present disclosure is to improve the SN ratio while maintaining the distance resolution, and to accurately detect the event occurrence location.

Means for Solving the Problem

In order to achieve the above object, an event detection device and an event detection method of the present disclosure analyze an OTDR waveform by using wavelet transform and detect an event in an optical fiber to be measured.

Specifically, an event detection device according to the present disclosure includes: an OTDR waveform acquisition unit that acquires an OTDR waveform of an optical fiber to be measured; a feature quantity extraction unit that performs wavelet transform on the OTDR waveform and generates a scalogram with each wavelet coefficient as a feature quantity; a peak extraction unit that calculates a noise threshold value from the OTDR waveform, and extracts a peak from the feature quantity on the scalogram based on the noise threshold value to generate a peak graph; and an event identification unit that identifies an event in the optical fiber to be measured from the peak graph.

In the event detection device according to the present disclosure, the feature quantity extraction unit may increase a scale value by a factor of $2^{1/2}$.

In the event detection device according to the present disclosure, the peak extraction unit may obtain an upper limit noise threshold value and a lower limit noise threshold value as the noise threshold value, extract, on the scalogram, only the feature quantity equal to or greater than the upper limit noise threshold value and the feature quantity equal to or less than the lower limit noise threshold value as the peaks, and generate the peak graph in which the extracted peaks are represented by a plurality of types of plots according to values of the peaks, and the event identification unit may connect the plots with lines on the peak graph based on the types of the plots and a distance between the plots, and, in a case in which the lines are connected in a scale direction, the event identification unit may determine that an event has occurred at the distance where the lines are located.

Specifically, an event detection method according to the present disclosure includes: an OTDR waveform acquisition step of acquiring an OTDR waveform of an optical fiber to be measured; a feature quantity extraction step of performing wavelet transform on the OTDR waveform and generating a scalogram with each wavelet coefficient as a feature quantity; a peak extraction step of calculating a noise threshold value from the OTDR waveform, and extracting a peak from the feature quantity on the scalogram based on the noise threshold value to generate a peak graph; and an event identification step of identifying an event in the optical fiber to be measured from the peak graph.

In the event detection method according to the present disclosure, in the feature quantity extraction step, a scale value may be increased by a factor of $2^{1/2}$.

In the event detection method according to the present disclosure, in the peak extraction step, an upper limit noise threshold value and a lower limit noise threshold value may be obtained as the noise threshold value, only the feature quantity equal to or greater than the upper limit noise threshold value and the feature quantity equal to or less than the lower limit noise threshold value may be extracted as the peaks on the scalogram, and the peak graph in which the extracted peaks are represented by a plurality of types of plots according to values of the peaks may be generated, and in the event identification step, the plots may be connected with lines on the peak graph based on the types of the plots and a distance between the plots, and, in a case in which the lines are connected in a scale direction, it may be determined that an event has occurred at the distance where the lines are located.

The above inventions can be combined as much as possible.

Advantage of the Invention

According to the present disclosure, it is possible to improve the SN ratio while maintaining the distance resolution and to accurately detect the event occurrence location.

BEST MODE FOR CARRYING OUT THE INVENTION

Figure 1:
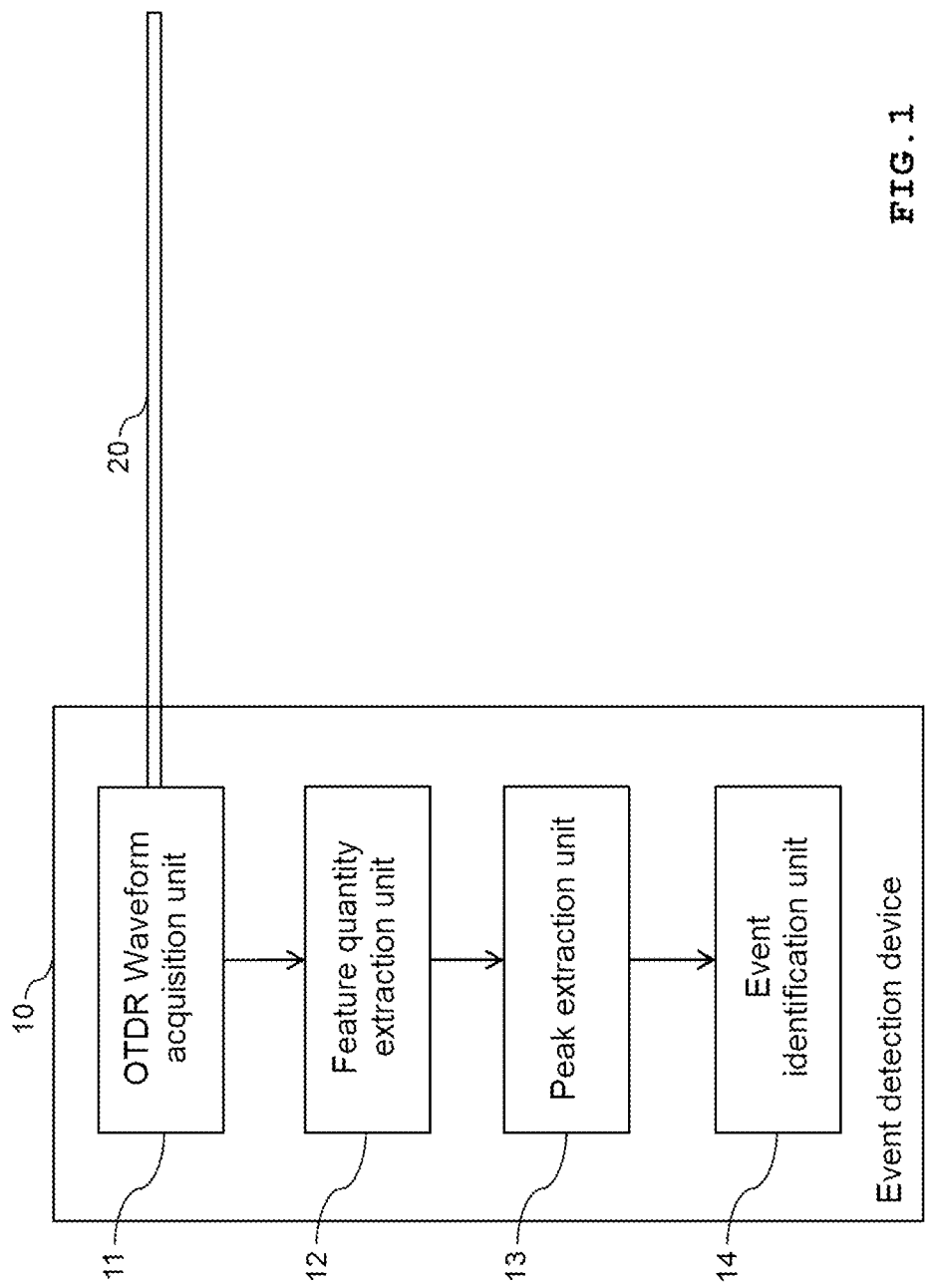
FIG. 1 shows an example of a schematic configuration of an event detection device according to a first embodiment.

Hereinafter, an embodiment of the present disclosure will be described in detail with reference to the drawings. The present disclosure is not limited to the embodiment shown below. These implementation examples are merely illustrative, and the present disclosure can be implemented in a variety of modified and improved forms based on the knowledge of those skilled in the art. In the present specification and the drawings, components having the same reference numerals indicate the same as each other.

First Embodiment

FIG. 1 shows an example of a schematic configuration of an event detection device according to the present embodiment. An event detection device according to the present embodiment includes: an OTDR waveform acquisition unit 11 that acquires an OTDR waveform of an optical fiber to be measured 20; a feature quantity extraction unit 12 that performs wavelet transform on the OTDR waveform and generates a scalogram with each wavelet coefficient as a feature quantity; a peak extraction unit 13 that calculates a noise threshold value from the OTDR waveform, and extracts a peak from the feature quantity on the scalogram based on the noise threshold value to generate a peak graph; and an event identification unit 14 that identifies an event in the optical fiber to be measured 20 from the peak graph.

(OTDR Waveform Acquisition Step)

Figure 2:
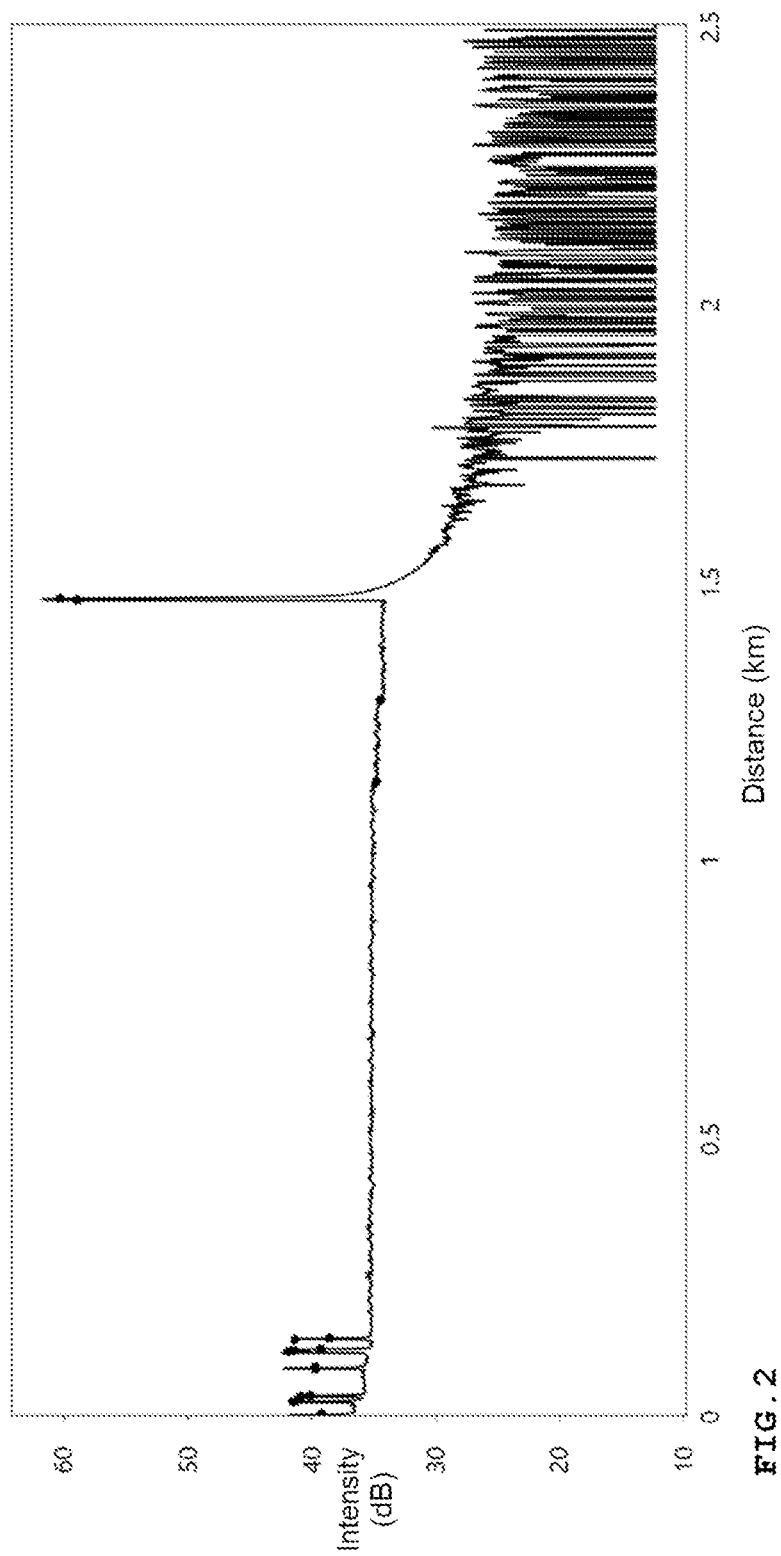
FIG. 2 shows an example of an OTDR waveform acquired by the event detection device according to the first embodiment.

The OTDR waveform acquisition unit 11 acquires the OTDR waveform from the optical fiber to be measured 20. For example, the OTDR waveform acquisition unit 11 receives an optical pulse made incident from one end of the optical fiber to be measured 20, and acquires a time distribution of an intensity of back scattered light output from the one end of the optical fiber to be measured 20 into which the optical pulse is made incident, as the OTDR waveform. An example of the OTDR waveform is shown in FIG. 2. Hereinafter, the term "distance from one end of the optical fiber to be measured 20 to which the optical pulse is made incident to a point of origin of the back scattered light" is referred to as "distance".

(Feature Quantity Extraction Step)

The feature quantity extraction unit 12 performs wavelet transform on the OTDR waveform acquired by the OTDR waveform acquisition unit 11 using Equation (1) to obtain a wavelet coefficient X(a,b).

$$X(a,b) = \int_{-\infty}^{\infty} x(t) \overline{\psi}_{a,b}(t) dx \quad (1)$$

Here, a represents a scale, b represents a distance shift, x(t) represents an OTDR waveform, and ψ bar represents a mother wavelet. The feature quantity extraction unit 12 treats the wavelet coefficient X(a,b) as a feature quantity of the scale a at the distance b.

The feature quantity extraction unit 12 may perform the wavelet transform using a Haar function as the mother wavelet. By using the Haar function, the computational complexity of the wavelet transform can be suppressed. Note that the mother wavelet is not limited to this, and may be another function.

In addition, the feature quantity extraction unit 12 may increase a value of the scale a by a factor of $2^{1/n}$, where n is an integer of 2 or more. By increasing n, it is possible to suppress the computational complexity while making a resolution of the scalogram in a frequency direction fine by 1/n.

Figure 3:
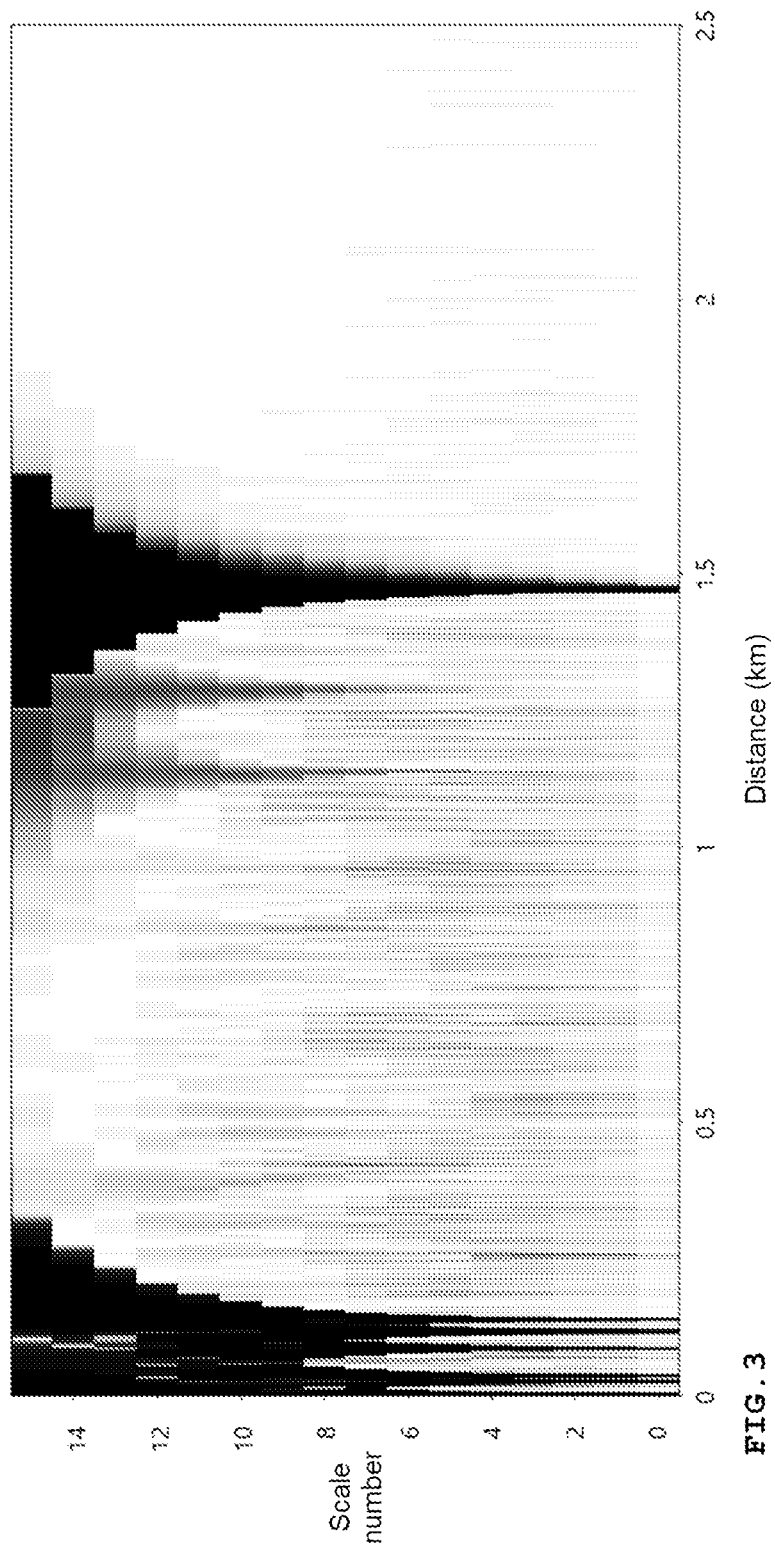
FIG. 3 shows an example of a scalogram according to the first embodiment.

The feature quantity X(a,b) obtained from the OTDR waveform shown in FIG. 2 will be described with reference to FIG. 3. The acquired feature quantity X(a,b) can be represented by a scalogram as shown in FIG. 3 in which a vertical axis represents the number of the scale a and a horizontal axis represents the distance. Here, the number of the scale a is the number of integers assigned from 0 in ascending order of a value on a discrete scale a. In addition, in FIG. 3, an absolute value of the feature quantity increases as the color turns black, and the feature quantity is closer to zero as the color turns white. In FIG. 3, for ease of understanding, the larger the absolute value of the feature quantity, the darker the black portion, but the black portion includes positive and negative values.

(Peak Extraction Step)

The peak extraction unit 13 obtains a noise threshold value for each scale a based on the OTDR waveform acquired by the OTDR waveform acquisition unit 11. In the present embodiment, as the noise threshold value, a noise threshold value $Tu_a$ for a positive value feature quantity (hereinafter, "a noise threshold value $Tu_a$ for a positive value feature quantity" is abbreviated as "upper limit noise threshold value $Tu_a$"), and a noise threshold value $Td_a$ for a negative value feature quantity (hereinafter, "a noise threshold value $Td_a$ for a negative value feature quantity" is abbreviated as "lower limit noise threshold value $Td_a$") are used. The upper limit noise threshold value $Tu_a$ is calculated from Equation (2), and the lower limit noise threshold value $Td_a$ is calculated from Equation (3).

$$T_{u_a}(x) = T_a(x) + \frac{1}{k_\Delta} \Delta_a \cdot \overline{y_a}(x) \quad (2)$$

$$T_{d_a}(x) = -T_a(x) + k_\Delta \Delta_a \cdot \overline{y_a}(x) \quad (3)$$

In Equations (2) and (3), $k_\Delta$ represents a transmission loss threshold coefficient, and $y_a$ bar (x) represents waveform data [dBm] obtained by multiplying the OTDR waveform by a moving average with a window width equivalent to the scale a. $T_a(X)$ is calculated using Equation (4), and $\Delta_a$ is calculated using Equation (5).

$$T_a(x) = k_t \cdot r_{t_a} \cdot \sigma_t + k_i \cdot r_{i_a} \cdot R_i \cdot \overline{y_a}(x) \qquad (4)$$

$$\Delta_a = \frac{5}{\delta \cdot a \cdot A \cdot \log 10} \left( 10^{\frac{\delta \cdot a \cdot A}{5}} + 10^{\frac{-\delta \cdot a \cdot A}{5}} - 2 \right) \qquad (5)$$

In Equation (4), x represents a distance [km], $r_{t_a}$ represents a reduction rate of standard deviation of thermal noise when the wavelet transform of the scale a is applied, $r_{i_a}$ represents a reduction rate of standard deviation of intensity noise when the wavelet transform of the scale a is applied, $\sigma_t$ represents standard deviation of thermal noise, $R_i$ represents a proportionality factor of standard deviation of intensity noise to an intensity, $k_A$ represents a transmission loss threshold coefficient, $k_t$ represents thermal noise threshold coefficient, and $k_i$ represents intensity noise threshold coefficient. Here, in Equation (4), $\sigma_t$ may be obtained from a noise portion of the OTDR waveform, for example, a portion where a light intensity is close to zero, and $R_i$ may be obtained from a portion where the SN ratio is close to zero.

In Equation (5), $\delta$ represents a sampling resolution [km], and A represents a transmission loss [dB/km].

Figure 4:
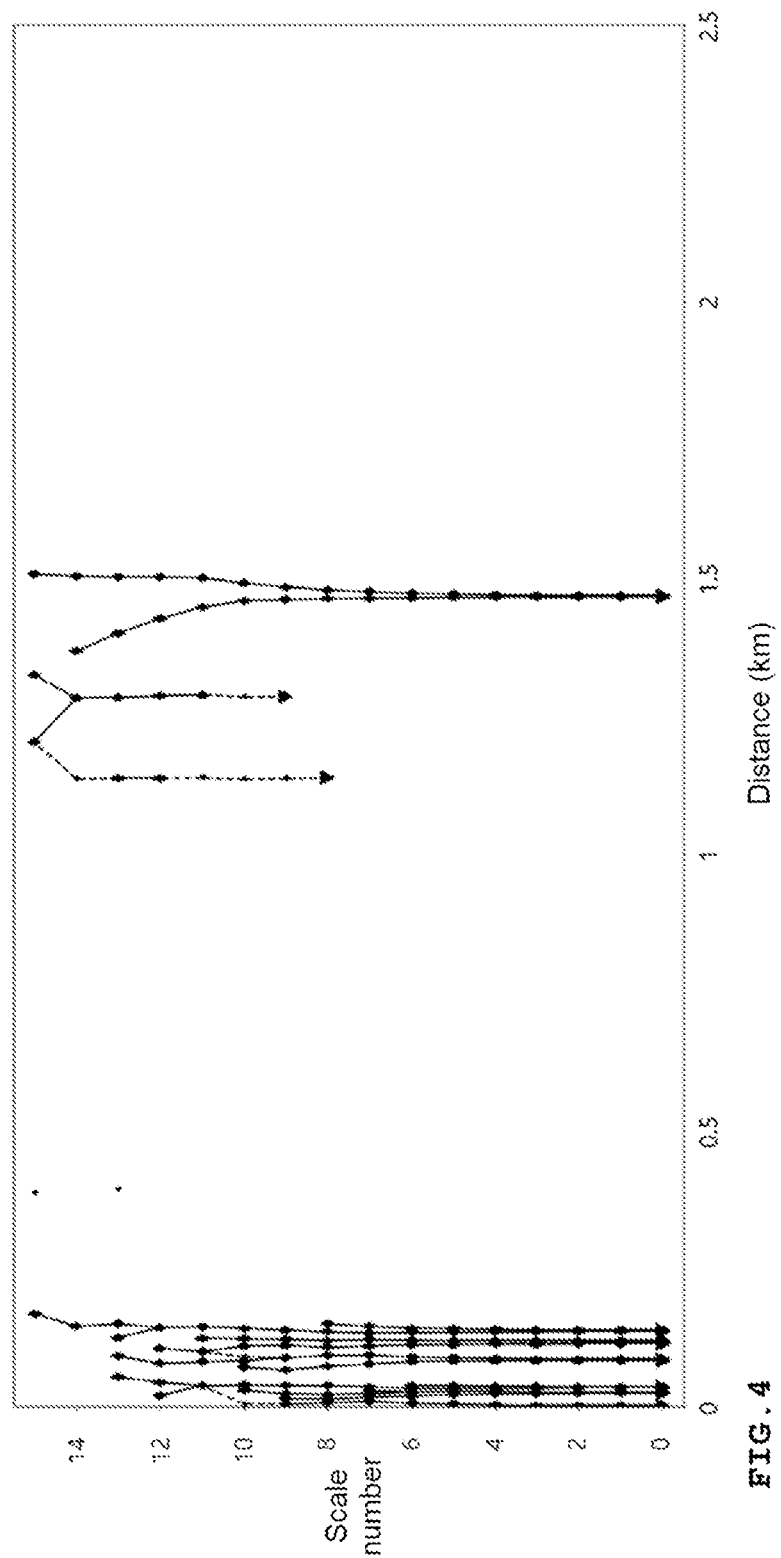
FIG. 4 shows an example of a peak graph according to the first embodiment.

The peak extraction unit 13 extracts the feature quantity exceeding the noise threshold value as a peak to create a peak graph. Here, the feature quantity exceeding the noise threshold value means the feature quantity equal to or greater than the upper limit noise threshold value in a case in which the feature quantity is positive, and means the feature quantity equal to or less than the lower limit noise threshold value in a case in which the feature quantity is negative. An example of the peak graph is shown in FIG. 4. The peak extraction unit 13 may change a type of a plot representing the peak according to a degree of exceeding the noise threshold value. In FIG. 4, peaks equal to or greater than two times the upper limit noise threshold value and peaks equal to or less than two times the lower limit noise threshold value are plotted as diamonds. In FIG. 4, peaks equal to or greater than the upper limit noise threshold value but less than two times the upper limit noise threshold value and peaks equal to or less than the lower limit noise threshold value but greater than two times the lower limit noise threshold value are plotted as circles. Lines and triangular plots on the peak graph are described below. The plot is an example, and is not limited to this.

(Event Identification Step)

The event identification unit 14 connects the plots with lines on the peak graph based on the type of the plot and the distance between the plots. In the present embodiment, in order from the plot with the highest scale, a corresponding plot and a plot within a certain distance are connected with a line. In this case, lines may be unconditionally connected between the diamond plots and between the diamond plot and the circle plot. In addition, in a case of connection between the circle plots, the circle plots may be connected with a line only in a case in which at least one of the circle plots is present on a line including the diamond plot. In FIG. 4, the lines connecting the diamond plots are solid lines, and the other lines are dashed lines. In addition, the plot that is an end of the line with a smaller scale is changed to a triangular plot.

Figure 7A:
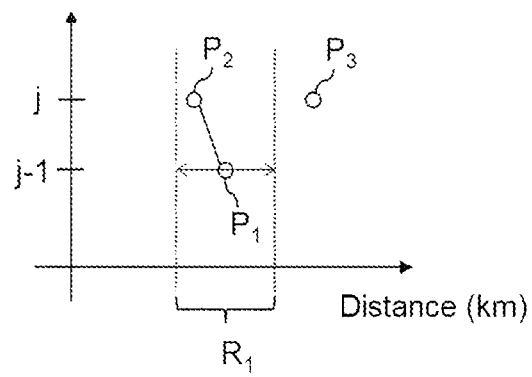
FIG. 7A and FIG. 7B are diagrams for describing connections between plots on a peak graph.
Figure 7B:
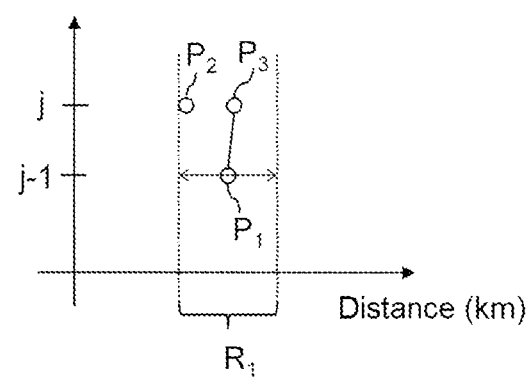

Here, the connection between plots in a case in which there are plots on two scales with consecutive scale numbers will be described with reference to FIGS. 7A and 7B and FIG. 8. In FIGS. 7A and 7B, there are plots $P_2$ and $P_3$ on the scale number j, and there is a plot $P_1$ on the scale number j−1. The plot $P_2$ with the scale number j is within a predetermined range $R_1$ in a distance direction of the plot $P_1$ with the scale number j−1. Therefore, the event identification unit 14 connects the plot $P_2$ with the scale number j and the plot $P_1$ with the scale number j−1 with a line. The plot $P_3$ with the scale number j is not within the predetermined range $R_1$ in the distance direction of the plot $P_1$ with the scale number j−1. Therefore, the event identification unit 14 does not connect the plot $P_3$ with the scale number j and the plot $P_1$ with the scale number j−1 with a line. In addition, as shown in FIG. 7B, in a case in which a plurality of the plots $P_2$ and $P_3$ are present within the predetermined range $R_1$ in the distance direction of the plot $P_1$ with the scale number j−1, the event identification unit 14 may connect only the plot $P_3$ with the scale number j, which is closest to the plot $P_1$ with the scale number j−1, and the plot $P_1$ with the scale number j−1 with a line.

Figure 8:
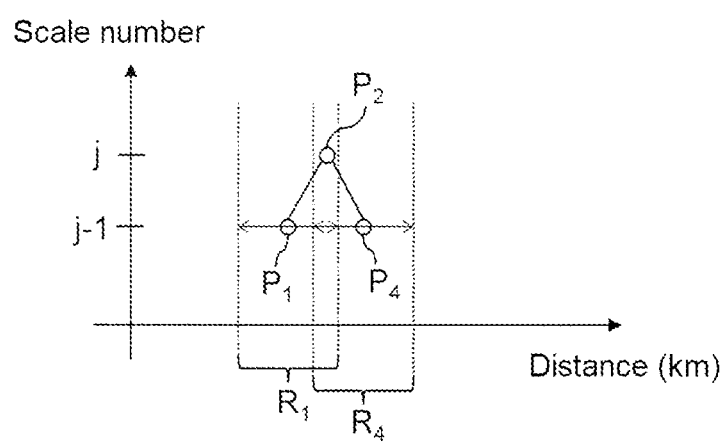
FIG. 8 is a diagram for describing connections between plots on a peak graph.

In FIG. 8, there is a plot $P_2$ on the scale number j, and there are plots $P_1$ and $P_4$ on the scale number j−1. FIG. 8 shows a case in which the plot $P_2$ with the scale number j is included in both a predetermined range $R_1$ in a distance direction of the plot $P_1$ with the scale number j−1 and a predetermined range $R_4$ in a distance direction of the plot $P_4$ with the scale number j−1. In such a case, the event identification unit 14 may connect the plot $P_1$ with the scale number j−1 and the plot $P_2$ with the scale number j with a line, and may connect the plot $P_4$ with the scale number j−1 and the plot $P_2$ with the scale number j with a line.

In a case in which lines are connected in a scale direction on the peak graph, the event identification unit 14 determines that an event has occurred in the optical fiber to be measured 20 at a distance where the lines are connected in the scale direction. In addition, conditions for the event occurrence may be such that each type of a plot or line on the peak graph is weighted, and in a case in which there is a line where the total weight computed from the type of a plot or line on the line is equal to or greater than a predetermined value, it is determined that an event has occurred at the distance where the line is located. For example, in FIG. 4, solid lines may have a weight of 2 and dashed lines may have a weight of 1. In this case, it may be determined that an event has occurred at a distance where a line with a weight of 5 or more is located.

Figure 5:
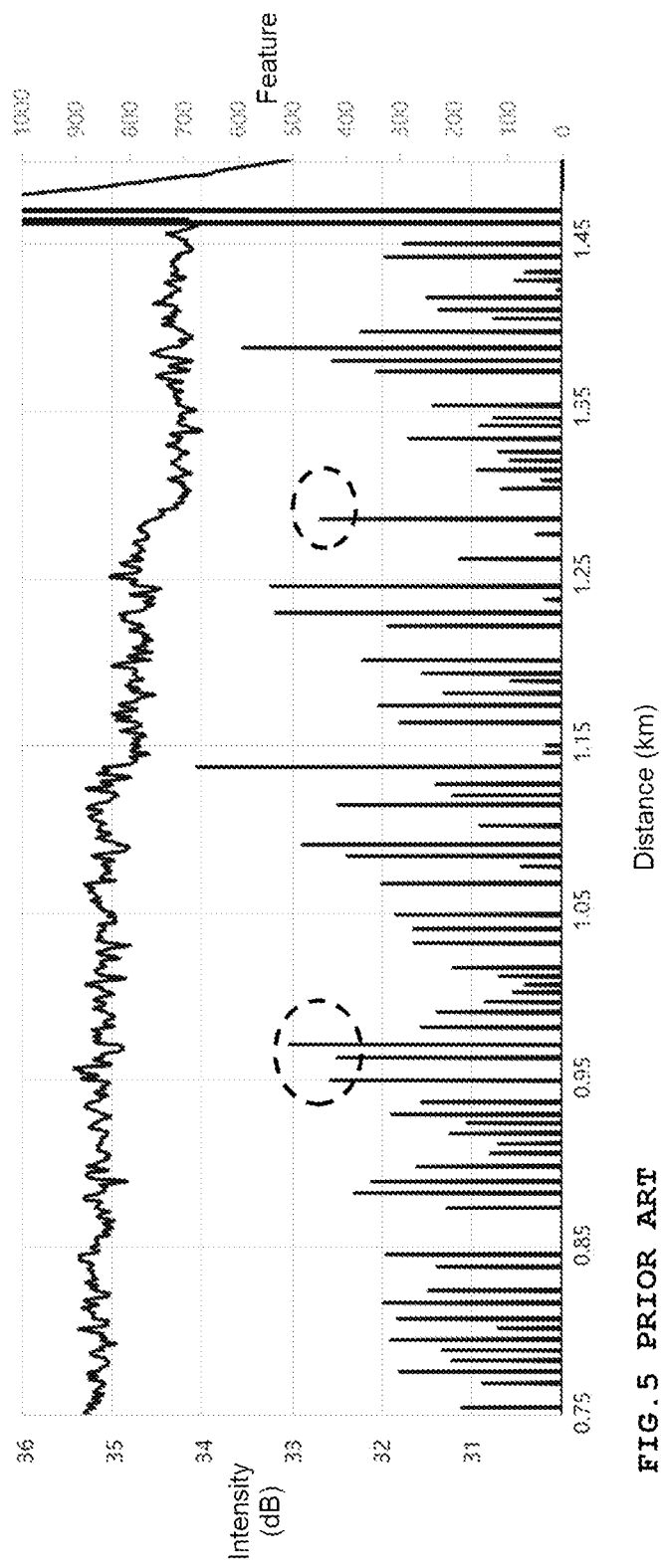
FIG. 5 shows an example of an analysis result of an OTDR waveform by a differential method in the related art.

FIG. 5 shows a result of event detection by a differential method in the related art. In the differential method, as described above, there is a trade-off relationship between the improvement of the SN ratio and the improvement of the distance resolution. Therefore, for example, in a case in which event detection was performed with priority given to improving the distance resolution, a differential coefficient (difference amount) was larger even for noise, so that it was not possible to distinguish between the noise and the event around 1 km or 1.28 km, as shown by dashed circles in FIG. 5.

Figure 6:
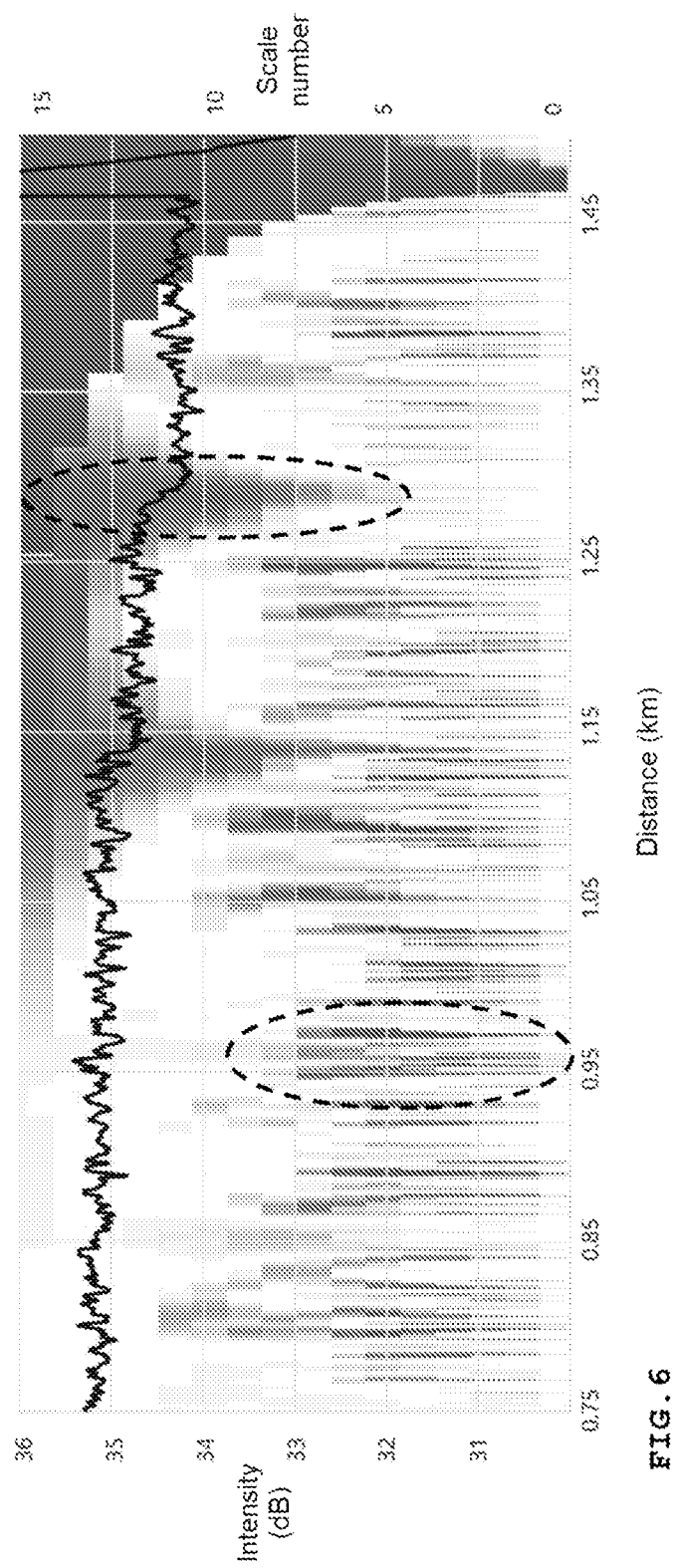
FIG. 6 shows an example of an analysis result of an OTDR waveform by wavelet transform of the present disclosure.

FIG. 6 shows a result of event detection according to the present disclosure. As described above, in the present disclosure, by applying a wavelet transform to the OTDR waveform, it is possible to eliminate the trade-off relationship between the improvement of the SN ratio and the improvement of the distance resolution, and to detect an event around 1 km or 1.28 km, as shown by dashed circles in FIG. 6.

As described above, according to the present disclosure, it is possible to improve the SN ratio while maintaining the distance resolution and to accurately detect the event occurrence location.

INDUSTRIAL APPLICABILITY

The event detection device and the event detection method according to the present disclosure can be applied to an optical measuring instrument industry.

DESCRIPTION OF REFERENCE NUMERALS AND SIGNS

10: Event detection device
11: OTDR waveform acquisition unit
12: Feature quantity extraction unit
13: Peak extraction unit
14: Event identification unit
20: Optical fiber to be measured

What is claimed is:

1. An event detection device comprising:
one or more processors collectively configured to:
acquire an OTDR waveform of an optical fiber to be measured;
perform a wavelet transform on the OTDR waveform and generates a scalogram with each wavelet coefficient as a feature quantity, wherein a scale value of the scalogram is increased by a factor of $2^{1/2}$;
calculate a noise threshold value from the OTDR waveform, and extracts a peak from the feature quantity on the scalogram based on the noise threshold value to generate a peak graph; and
identify an event in the optical fiber to be measured from the peak graph.

2. The event detection device according to claim 1, wherein the one or more processors are further collectively configured to:
obtain an upper limit noise threshold value and a lower limit noise threshold value as the noise threshold value,
extract, on the scalogram, only the feature quantity equal to or greater than the upper limit noise threshold value and the feature quantity equal to or less than the lower limit noise threshold value as the peaks,
generate the peak graph in which the extracted peaks are represented by a plurality of types of plots according to values of the peaks,
connect the plots with lines on the peak graph based on the types of the plots and a distance between the plots, and,
in a case in which the lines are connected in a scale direction, determine that an event has occurred at the distance where the lines are located.

3. An event detection method comprising:
an OTDR waveform acquisition step of acquiring an OTDR waveform of an optical fiber to be measured;
a feature quantity extraction step of performing wavelet transform on the OTDR waveform and generating a scalogram with each wavelet coefficient as a feature quantity;
a peak extraction step of calculating a noise threshold value from the OTDR waveform, and extracting a peak from the feature quantity on the scalogram based on the noise threshold value to generate a peak graph; and
an event identification step of identifying an event in the optical fiber to be measured from the peak graph,
wherein, in the feature quantity extraction step, a scale value of the scalogram is increased by a factor of $2^{1/2}$.

4. The event detection method according to claim 3, wherein, in the peak extraction step, an upper limit noise threshold value and a lower limit noise threshold value are obtained as the noise threshold value, only the feature quantity equal to or greater than the upper limit noise threshold value and the feature quantity equal to or less than the lower limit noise threshold value are extracted as the peaks on the scalogram, and the peak graph in which the extracted peaks are represented by a plurality of types of plots according to values of the peaks is generated, and
in the event identification step, the plots are connected with lines on the peak graph based on the types of the plots and a distance between the plots, and, in a case in which the lines are connected in a scale direction, it is determined that an event has occurred at the distance where the lines are located.

* * * * *